United States Patent
Sundqvist

(10) Patent No.: US 9,286,807 B2
(45) Date of Patent: Mar. 15, 2016

(54) COLLISION AVOIDANCE SYSTEM AND A METHOD FOR DETERMINING AN ESCAPE MANOEUVRE TRAJECTORY FOR COLLISION AVOIDANCE

(75) Inventor: Bengt-Göran Sundqvist, Linköping (SE)

(73) Assignee: SAAB AB, Linköping (SE)

( * ) Notice: Subject to any disclaimer, the term of this patent is extended or adjusted under 35 U.S.C. 154(b) by 487 days.

(21) Appl. No.: 12/617,787

(22) Filed: Nov. 13, 2009

(65) Prior Publication Data

US 2010/0121503 A1  May 13, 2010

(30) Foreign Application Priority Data

Nov. 13, 2008 (EP) .................................. 08169000

(51) Int. Cl.
- G05D 1/00 (2006.01)
- G05D 3/00 (2006.01)
- G06F 7/00 (2006.01)
- G06F 17/00 (2006.01)
- G08G 5/04 (2006.01)
- G05D 1/02 (2006.01)
- G08G 5/00 (2006.01)

(52) U.S. Cl.
CPC .............. G08G 5/045 (2013.01); G05D 1/0287 (2013.01); G08G 5/0008 (2013.01)

(58) Field of Classification Search
USPC .......................................................... 701/11
See application file for complete search history.

(56) References Cited

U.S. PATENT DOCUMENTS

| | | | | |
|---|---|---|---|---|
| 4,338,672 A * | 7/1982 | Perzley et al. | | 700/249 |
| 5,058,024 A | 10/1991 | Inselberg | | |
| 5,179,514 A * | 1/1993 | Rastegar et al. | | 700/63 |
| 6,278,907 B1 | 8/2001 | Fromherz et al. | | |
| 6,510,388 B1 * | 1/2003 | Sporrong | | G08G 5/8045 342/455 |
| 2003/0014165 A1 * | 1/2003 | Baker et al. | | 701/3 |
| 2003/0025614 A1 * | 2/2003 | Kahn | | 340/961 |
| 2003/0216896 A1 * | 11/2003 | Betts et al. | | 703/2 |
| 2006/0052912 A1 * | 3/2006 | Meunier | | 701/10 |
| 2006/0089760 A1 * | 4/2006 | Love et al. | | 701/4 |
| 2008/0206719 A1 * | 8/2008 | Johnsson et al. | | 434/37 |
| 2008/0249669 A1 | 10/2008 | Skarman | | |
| 2009/0088972 A1 * | 4/2009 | Bushnell | | G01C 23/005 701/414 |
| 2009/0132103 A1 * | 5/2009 | Marty | | G01C 21/00 701/3 |
| 2009/0157241 A1 * | 6/2009 | Meunier et al. | | 701/9 |

OTHER PUBLICATIONS

Eurpoean Search Report—Apr. 22, 2009.

* cited by examiner

Primary Examiner — Imran Mustafa
(74) Attorney, Agent, or Firm — Venable LLP; Eric J. Franklin

(57) ABSTRACT

A collision avoidance system including a receiver configured to receive navigational data regarding intruding aerial vehicle and own aircraft. Storage is configured to store a plurality of predefined escape trajectories. A processor is configured to compare at least a subset of the predefined escape trajectories with a presumed trajectory of the intruding aerial vehicle and to select one of the predefined escape trajectories based on the comparison. The predefined escape trajectories are pre-simulated, wherein each escape trajectory is associated to a set of navigational data and to an escape maneuver direction.

8 Claims, 3 Drawing Sheets

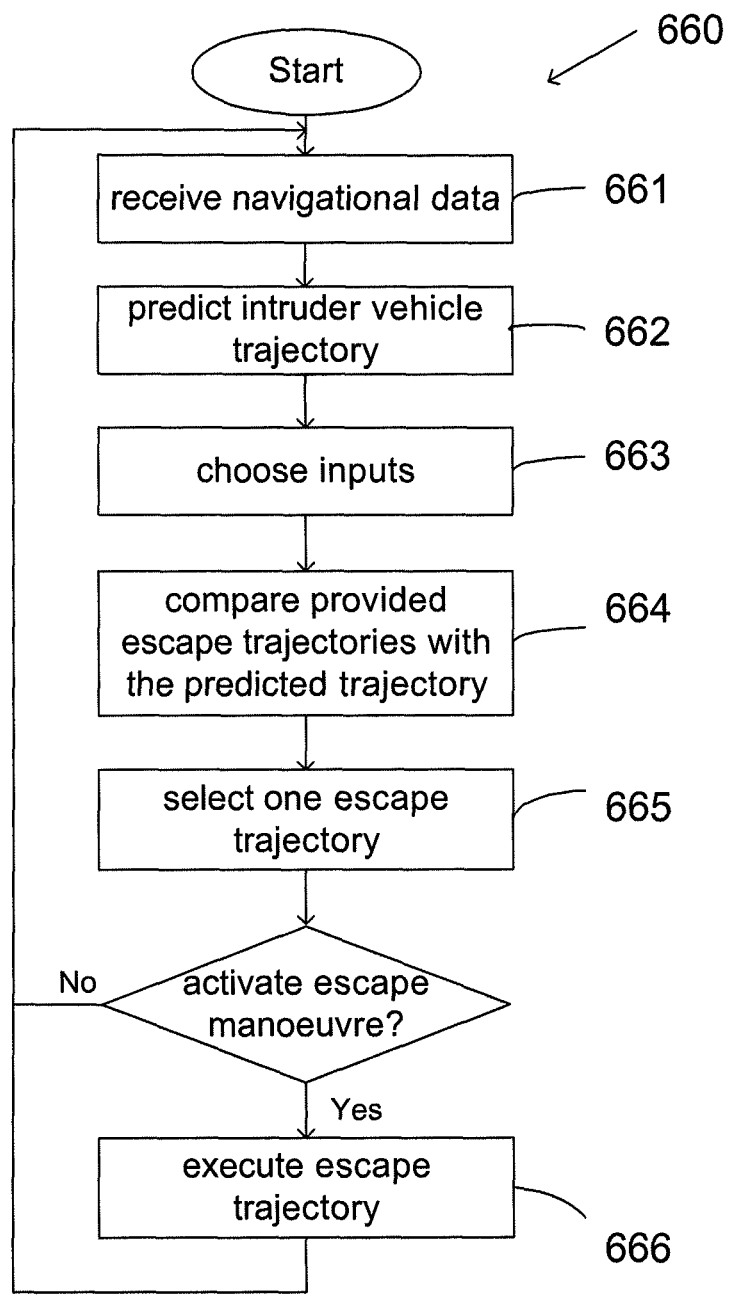

COLLISION AVOIDANCE SYSTEM AND A METHOD FOR DETERMINING AN ESCAPE MANOEUVRE TRAJECTORY FOR COLLISION AVOIDANCE

CROSS-REFERENCE TO RELATED APPLICATIONS

This application claims priority to European patent application 08169000.0 filed 13 Nov. 2008.

TECHNICAL FIELD

The present invention relates to collision avoidance systems and especially to determination of escape manoeuvres in said collision avoidance systems.

BACKGROUND ART

In order to allow unmanned aerial vehicles (UAVs) to travel in civil unsegregated airspace, several technical problems must be solved. One of the most important issues is the "sense & avoid" problem: a UAV must be able to sense the presence of other aerial vehicles and, if necessary, perform an autonomous and safe last instant maneuver to avoid mid-air collision. Therefore, it is required that the UAV comprises an air collision avoidance system, sometimes also referred to as a Sense & Avoid system so as to be allowed to travel in unsegregated airspace. The air collision avoidance system would then comprise one or several sensors for sensing intruding aircraft, and collision avoidance functionality that uses the sensed data and the performance characteristics of the own aircraft to perform a safe escape maneuver.

The calculation of escape maneuvers requires large amount of processor capacity, and accordingly a limited amount of possible escape maneuvers can be tested so as to find a suitable escape maneuver.

SUMMARY OF THE INVENTION

One object of the present invention is to reduce the processor requirement for calculating an escape manoeuvre trajectory.

This has in accordance with one embodiment of the present invention been achieved by means of a collision avoidance system comprising means for receiving navigational data regarding intruding aerial vehicle and own aircraft; means for storing a plurality of predefined escape trajectories, and processing means arranged to compare at least a subset of the predefined escape trajectories with a presumed trajectory of the intruding aerial vehicle and to select one of the predefined escape trajectories based on said comparison. The predefined escape trajectories are pre-simulated, each escape trajectory being associated to a set of navigational data and to an escape manoeuvre direction or the like. The wording "escape manoeuvre direction or the like" is intended to include any representation of the escape manoeuvre.

The presumed trajectory of the intruding aerial vehicle can be obtained in many different ways. In one example, the processing means are arranged to calculate the presumed trajectory of the intruding aerial vehicle based on the received navigational data regarding the intruding aerial vehicle. Alternatively, the presumed trajectory is an escape trajectory of the intruding aerial vehicle. The information related to said presumed escape trajectory is for example received over a link. In yet another alternative, the presumed trajectory of the intruding vehicle is a intent or flight plan received over transponer/link.

The set of navigational data comprises for example one or a plurality of the following quantities: velocity, altitude, attitude, and/or climb angle.

In using said predefined pre-simulated escape trajectories, wherein each escape trajectory is associated to a set of navigational data and to an escape manoeuvre direction or the like, processor capacity is saved. No trajectories have to be calculated by the collision avoidance system, as those trajectories have been calculated offline. The simulation model used for calculating the pre-simulated trajectories can therefore be any model used in simulating the aerial vehicle. No separate simulation model needs to be implemented in the collision avoidance system. Further, the simulation model used for calculating the pre-simulated trajectories can be arranged to provide an uncertainty measure related to the model or to each calculated trajectory. As no escape trajectories are calculated by the collision avoidance system, a large amount of computer capacity is saved. This allows, for example, for testing a large amount of escape manoeuvre directions against the presumed trajectory without requirement of excessive processor capacity. Thereby, a globally optimal escape manoeuvre direction is allowed to be found.

In one example, the processing means are arranged to choose at least a subset of those predefined escape trajectories for which the set of navigational data substantially coincides with navigational data related to the own aircraft for comparison with the presumed trajectory of the intruding aerial vehicle.

The processing means are in one example arranged to calculate the presumed trajectory of the intruding aerial vehicle based on the received navigational data regarding the intruding aerial vehicle.

The collision avoidance system may also comprise escape manoeuvre execution means for executing an escape manoeuvre based on said selected pre-calculated escape trajectory. Further, second processing means may arranged to calculate a refined escape trajectory based on the escape manoeuvre direction of the selected escape trajectory and the escape manoeuvre execution means may be arranged to execute the escape manoeuvre based on the refined escape trajectory. The escape manoeuvre execution means are in one example activated by means of activation means arranged to activate said escape manoeuvre execution means based on one or a plurality of preset criteria.

The present invention also relates to a method for determining an escape manoeuvre trajectory for collision avoidance, said method comprising the steps of
  receiving navigational data regarding intruding aerial vehicle and own aircraft,
  comparing a plurality of predefined escape trajectories with a presumed trajectory of the intruding aerial vehicle, wherein each predefined escape trajectory is associated to one or a plurality of navigational data values and to an associated escape manoeuvre direction and
  selecting one of the predefined escape trajectories based on the comparison.

The comparison step comprises for example choosing a subset of escape trajectories associated to navigational data value(s) substantially coinciding with navigational data values related to the own vehicle and comparing said subset having different escape manoeuvre directions with said presumed trajectory.

The method may further comprise a pre-step of forming the pre-stored predefined escape trajectories, said forming of the predefined escape trajectories comprising simulating the behaviour of the own aircraft based on different assumed navigational data values and for a plurality of escape manoeuvre directions for each assumed navigational data value.

BRIEF DESCRIPTION OF THE DRAWINGS

FIG. 6 is a flow chart illustrating a method for providing an escape trajectory.

DETAILED DESCRIPTION

Figure 1:
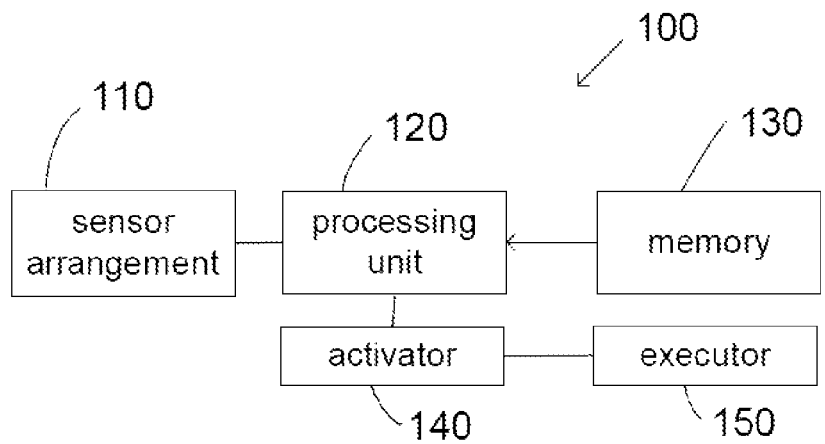
FIG. 1 is a block scheme illustrating a first example of a collision avoidance system.

In FIG. 1, a collision avoidance system 100 for avoidance of collisions between aerial vehicles is presented. The collision avoidance system is in one example implemented in such an aerial vehicle. The aerial vehicle is for example a fighter aircraft, an unmanned aircraft, or a passenger or transport aircraft. The collision avoidance system is especially suitable for aerial vehicles with low manoeuvrability. Low manoeuvrability is typically characterized by low dynamics, wherein the trajectories of involved aerial vehicles to a high extent are predictable. However, essentially all types of aerial vehicles can have low manoeuvrability and high manoeuvrability, in dependence of the current navigational states of the aerial vehicle. Accordingly, the collision avoidance system herein described is suitable for collision avoidance in a low manoeuvrability mode of operation.

The collision avoidance system 100 comprises a sensor arrangement 110, a processing unit 120, a memory unit 130, an activator unit 140 and an executor unit 150. The sensor arrangement 110 is arranged to receive sensor data representing navigational data related to an intruding aerial vehicle and the own aerial vehicle. The sensor arrangement comprises for example first sensors arranged to receive data related to the own aerial vehicle. The first sensors comprise for example a GPS-receiver and/or an inertial navigational system. The first sensors are in one example arranged to provide velocity data related to the own aerial vehicle. The first sensors can be arranged to provide also altitude data related to the own aerial vehicle.

The first sensors are in one example arranged to provide data related to all or a subset of the following quantities: velocity, altitude, attitude and angle of climb. The sensor arrangement comprises also second sensors arranged to receive data related to the intruding aerial vehicle. The second sensors comprise for example one or a plurality of electro-optical sensors. The electro-optical sensors may be any devices which are able to capture consecutive images of objects (such as intruding vehicles) in the surrounding airspace. In one embodiment of the invention, the electro-optical sensors are video cameras. From image processing, the sensor arrangement can then be arranged to determine the position and velocity based on size and expansion of the objects in consecutive images. In one example, the second sensors comprise a receiver arranged to receive data over a data link related to position, velocity etc of the intruding aerial vehicle. The second sensors may comprise a laser range finder and/or radar equipment in addition to or instead of the electro-optical sensors. The second sensors are in one example arranged to provide data related to all or a subset of the following quantities: velocity, altitude, attitude and bearing.

The memory 130 is arranged to store a plurality of predefined escape trajectories. The predefined escape trajectories are pre-simulated. Each escape trajectory is associated to a set of variables related to navigational data for the own aerial vehicle and to an evasive manoeuvre direction. The contents of the memory will be described more in detail in relation to FIGS. 3 and 4.

The processing unit 120 is arranged to compare at least a subset of the predefined escape trajectories of the memory 130 with a presumed trajectory of the intruding aerial vehicle, and to select one of the predefined escape trajectories or an interpolated escape trajectory based on said comparison. In practice, the processing unit 120 is in one example arranged to provide the presumed trajectory by calculating a predicted trajectory of the intruding vehicle based on data received by the second sensors of the sensor arrangement 110. The processing unit 120 is arranged to choose at least a subset of those predefined escape trajectories for which the state(s) of the set of navigational quantities substantially coincides with navigational state(s) related to the own aircraft (determined by the sensor arrangement) for comparison with the predicted trajectory of the intruding aerial vehicle. Accordingly, in a simple example wherein one escape trajectory has been pre-calculated for each velocity of the own aerial vehicle and for a plurality of escape manoeuvre directions, the processing unit is arranged to choose a subset of the escape trajectories calculated for at least approximately the same velocity as the present velocity of the own aerial vehicle. In one example, one or a plurality of interpolated escape trajectories are calculated based on the chosen subset of escape trajectories. Thus, the chosen subset comprises escape trajectories for a certain velocity for a plurality of different escape manoeuvre directions.

The escape manoeuvre directions are in one example spread 360° in a plane perpendicular to a longitudinal axis through the aerial vehicle or the like. The escape manoeuvre directions are in one example given as acceleration directions. The processing unit 120 is then arranged to select escape manoeuvre based on a number of preset criteria. One such criterion is to select an escape trajectory being most distant from the presumed trajectory of the intruding aerial vehicle. This criterion can then be refined as it is for example conventionally allowed to pass closer to an intruding aerial vehicle height wise than laterally. Further, the uncertainty of the calculations can vary along the trajectories. This can be considered in determining the distance between the escape trajectories and the presumed trajectory of the intruding vehicle.

In one extended example, the processing unit 120 is arranged to update the predefined escape trajectories of the memory 130 before comparing at least a subset of the predefined escape trajectories of the memory 130 with a presumed trajectory of the intruding aerial vehicle. In detail, the processing unit 120 is in one example arranged to update the predefined escape trajectories so as to avoid for example ground collision. The processing unit 120 is then arranged to consider performance constraints of the own aircraft in updating the predefined escape trajectories.

The escape manoeuvre execution unit 150 of the collision avoidance system 100 comprises means for executing an escape manoeuvre in accordance with said selected pre-calculated escape trajectory. In one example, the aerial vehicle comprises a control unit (not shown) arranged to provide control signals to the actuators for automatically executing said escape manoeuvre. In accordance with this example, the control unit is connected to the activator 140. The activator 140 is arranged to activate said control unit based on one or a plurality of preset criteria. One preset criterion is for example a determined present distance to the intruding aerial vehicle. The sensor arrangement is arranged to provide such data. Another preset criterion, combinable with the first mentioned criterion, is the minimum radial distance between the escape trajectory and the predicted trajectory of the intruding aerial vehicle. The minimum radial distance is for example provided from the processing unit 120. In another example, the activation of the control unit of the execution means 150 is manually controlled for example by a pilot of the aerial vehicle or from ground based control. In this example, the activator is obsolete. In yet another example, the escape manoeuvre execution means comprises a display unit arranged to display the selected trajectory so that the pilot or ground based control can control the aerial vehicle so as to follow the displayed trajectory. The display comprises then for example data related to a difference between the present escape manoeuvre command and a measured state. The data comprises for example a roll angle error and/or a load factor error.

Figure 2:
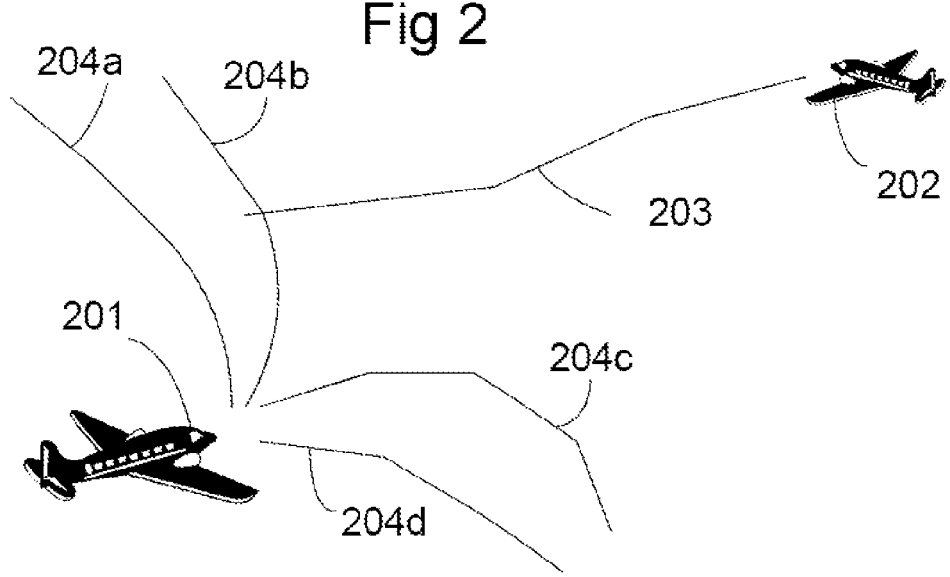
FIG. 2 illustrates an own aerial vehicle and an intruding vehicle approaching each other.

In FIG. 2, an own aerial vehicle 201 and an intruding aerial vehicle 201 are approaching each other. A presumed trajectory of the intruding vehicle 201 is illustrated by means of an unbroken line 203. A number of predefined escape trajectories 204a, 204b, 204c, 204d of the own aerial vehicle 201 are depicted.

Figure 3:
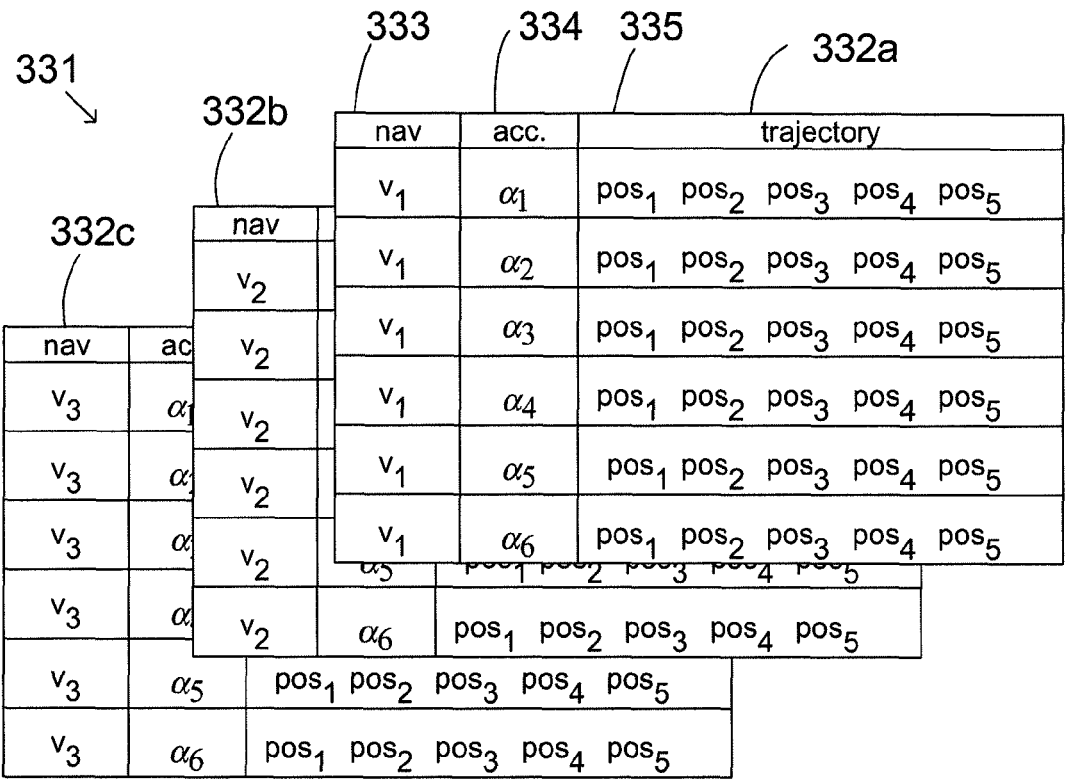
FIG. 3 schematically illustrates one example of the contents of a memory unit in the collision avoidance system of FIG. 1.

In FIG. 3, the memory unit 130 in FIG. 1 comprises a table 331 comprising a plurality of table sheets 332a, 332b, 332c. Each table sheet comprises a first field 333 for a navigational data variable indicating the value of said variable, a second field 334 indicating an escape manoeuvre direction and a third field 335 defining the escape manoeuvre associated to the navigational data variable value given in the first field 333 and the associated evasive manoeuvre direction given in the second field 334. In one example the third field 335 comprises a sequence of time stamped coordinates related to said escape manoeuvre. In an alternative or complementary example, the third field 335 comprises time stamped velocity and/or acceleration vectors. Each table sheet 332a, 332b, 332c is related to one navigational data variable value common for the table sheet. Each table sheet 332a, 332b, 332c relates to a plurality of escape manoeuvre directions given in the second field. The escape manoeuvre directions are in one example spread 360° in a plane perpendicular to a longitudinal axis or the like through the aerial vehicle. In an alternative example, the escape manoeuvre directions are spread in an alternative manner in relation to said plane. In one example, the escape manoeuvre directions are limited to a restricted escape manoeuvre space, such as a space on the right side of the plane (so that no escape manoeuvres to the left are considered). The escape manoeuvre direction is in one example given as an effective acceleration direction, as stated above. In another example, the escape manoeuvre direction is calculated as an integral of a roll velocity. The coordinates for the escape manoeuvre indicated in the third field 335 are pre-calculated using a simulation model of the behaviour of the own aerial vehicle 201. As the simulations are performed in advance, the complexity of the simulation model is of no concern. The simulation model used may be adapted for the individual aerial vehicle or the aerial vehicle type. The model may be adapted to model a plurality of systems of the aerial vehicle, for example the engine, the hydraulics, servos, pilot control, aerodynamic characteristics, etc. In one example, the length of the simulated escape manoeuvre and/or the step length (i.e. the time intervals between consecutive coordinate calculation points) are/is chosen based on the dynamics of the aerial vehicle. In one example, the simulation model is further arranged to provide a measure of the accuracy of the model. The determined accuracy of the model can then be used by the collision avoidance system so as to determine the total uncertainty in the calculations. Thereby, set up requirements related to allowed probability of mid air collisions can be handled by the collision avoidance system.

Figure 4:
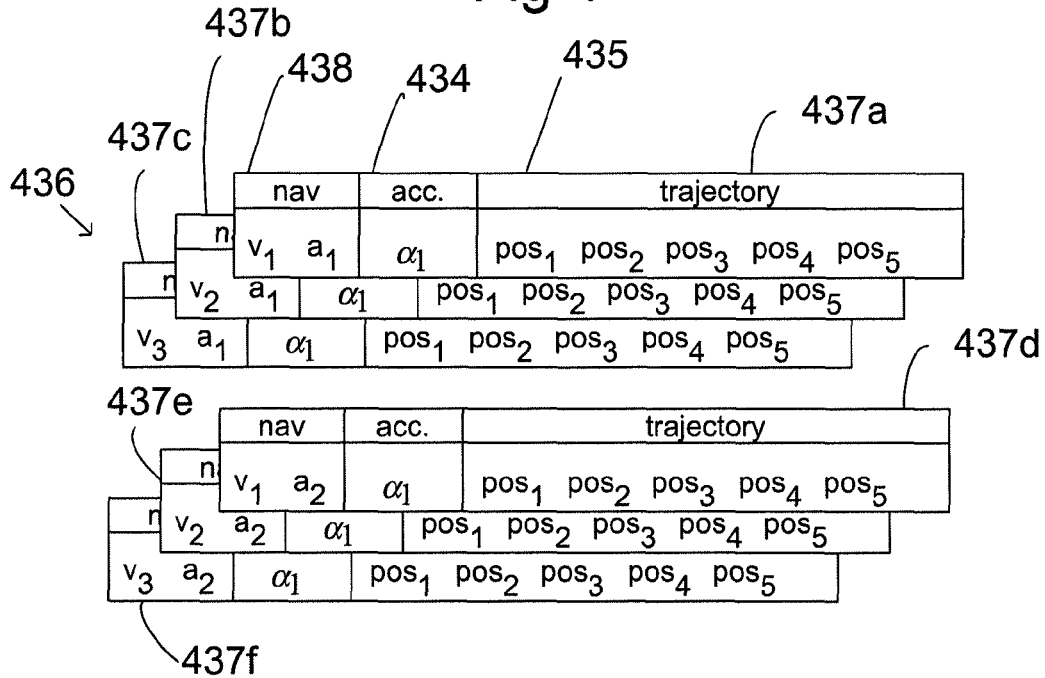
FIG. 4 schematically illustrates another example of the contents of the memory unit in the collision avoidance system of FIG. 1.

In FIG. 4, the memory unit 130 in FIG. 1 comprises a table 436 comprising a plurality of table sheets 437a, 437b, 437c, 437d, 437e, 437f. Each table sheet 437a, 437b, 437c, 437d, 437e, 437f comprises a first field 338 for two navigational data variables indicating the values of said variables, a second field 434 indicating an escape manoeuvre direction and a third field 435 indicating the coordinates for an escape manoeuvre associated to the navigational data variable values given in the first field 438 and the associated evasive manoeuvre direction given in the second field 434. Each table sheet 437a, 437b, 437c, 437d, 437e, 437f is related to navigational data variable values common for the table sheet. In an alternative example, the first field 338 comprises the values of more than two navigational data variables.

The configuration of the tables in FIGS. 3 and 4 are just illustrative examples. The memory or memories can be configured in a plurality of ways, wherein one or a plurality of navigational data variable values, an escape direction and the coordinates of a corresponding escape trajectory are associated to each other.

Figure 5:
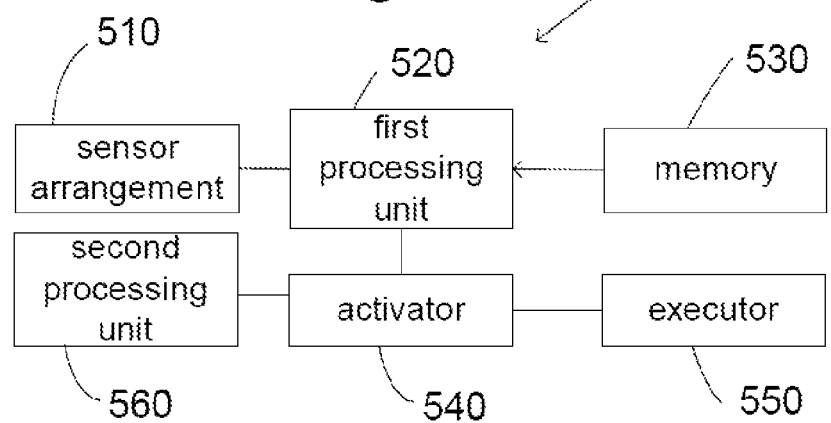
FIG. 5 is a block scheme illustrating a second example of a collision avoidance system.

In FIG. 5, an alternative collision avoidance system 500 for avoidance of collisions between aerial vehicles is presented. The collision avoidance system is for example implemented in such an aerial vehicle. The aerial vehicle is for example a fighter aircraft, an unmanned aircraft, or a passenger or transport aircraft. The collision avoidance system is especially suitable for aerial vehicles in a low manoeuvrability mode of operation.

The collision avoidance system 500 comprises a sensor arrangement 510, a first processing unit 520, a second processing unit 560, a memory unit 530, an activator unit 540 and an executor unit 550. The sensor arrangement 510 is equivalent to the sensor arrangement described in relation to FIG. 1. The memory unit 530 is equivalent to that described in relation to FIG. 1. The first processing unit 520 is arranged to compare at least a subset of the predefined escape trajectories of the memory 530 with a presumed trajectory of the intruding aerial vehicle, and to select one of the predefined escape trajectories based on said comparison in a manner equivalent to that of the processing unit described in relation to FIG. 1.

The activator unit 540 is connected to the second processing unit 560. The activator unit 540 is arranged to activate the second processing unit 560 based on one or a plurality of preset criteria. One preset criterion is for example a determined present distance to the intruding aerial vehicle. The sensor arrangement 510 is arranged to provide such distance data. Another preset criterion, combinable with the first mentioned criterion, is the minimum radial distance between the escape trajectory calculated by the first processing unit 520 and the presumed trajectory of the intruding aerial vehicle.

The second processing unit 560 is arranged to calculate a refined escape trajectory for use in determining whether the escape manoeuvre shall be activated or not. Accordingly, the second processing unit 560 is arranged to compute the escape trajectory in an alternative manner than the first processing unit, which first processing unit as described above uses the pre-simulated escape trajectories. In one example, the second processing unit 560 comprises a model of the aerial vehicle. The second processing unit is arranged to calculate the escape trajectory based on the implemented model of the aerial vehicle and based on the escape manoeuvre direction of the escape trajectory selected by the first processing unit 520. In one example, the model of the aerial vehicle is a so called aircraft response model. The aircraft response model is arranged to deliver positions or also velocities along an escape manoeuvre trajectory. In one example, the aircraft response model is arranged to simulate the values based on performance constraints in a present flight state (such as performance, initial velocity, acceleration, and/or rotation etc.) Thus, the escape trajectory provided by the second processing unit is generally more accurate than the corresponding escape trajectory provided by the first processing unit. Upon activation by the activator unit 540, the second processing unit 560 calculates the accurate escape manoeuvre in accordance with the above. The second processing unit 560 is then arranged to feed the coordinates of the calculated escape manoeuvre to the activator unit 540. The activator unit 540 is then arranged to determine whether an escape manoeuvre should be executed based on the escape manoeuvre trajectory calculated by the second processing unit 560 and on the above mentioned one or a plurality of preset criteria, or some other criteria The activator unit 540 is arranged to activate the executor unit 550. In one example, the activator unit 540 feeds the coordinates of the accurate escape trajectory calculated by the second processing unit 560 to the execution unit 550 for automatic execution. In another example, the activation of the execution unit 550 is manually controlled for example by a pilot of the aerial vehicle or from ground based control. Accordingly, in one example, the execution unit is activated upon activation by the pilot. In another example, the escape manoeuvre execution means comprises a display unit arranged to display the accurate escape trajectory calculated by the second processing unit 560 so that the pilot or ground based control can control the aerial vehicle so as to follow the displayed accurate escape trajectory. The display of the accurate escape trajectory can be updated continuously.

In FIG. 6, a method 660 for determining an escape manoeuvre trajectory for collision avoidance comprises a first step 661 of receiving navigational data regarding an intruding aerial vehicle and an own aerial vehicle. The navigational data is used for determining a presumed trajectory of the intruding aerial vehicle in a second step 662. Then, a subset is chosen from a plurality of predefined escape trajectories in a third step 663. Each predefined escape trajectory is associated to one or a plurality of navigational data values and to an associated escape manoeuvre direction. In the third step, the subset is chosen being associated to the same (or at least in the vicinity of) navigational data values as the present values related to corresponding navigational data of the own aerial vehicle. Accordingly, the escape trajectories of the chosen subset are associated to the same navigational data values but to different escape manoeuvre directions. In a fourth step 664, the escape trajectories of the chosen subset are compared to the presumed intruder vehicle trajectory calculated in the second step 662. In a fifth step 665, one escape trajectory is selected based on one or a plurality of criteria. The criteria comprises for example the distance between the escape trajectory and the presumed trajectory of the intruding aerial vehicle. In a sixth step 666, the execution of the escape trajectory is activated. The activation of the execution is for example determined based on the minimum distance between the escape trajectory and the presumed trajectory of the intruder aerial vehicle and/or on the present distance between the own aerial vehicle and the intruder vehicle. If the escape manoeuvre is activated, the escape trajectory selected in the fifth step or another escape trajectory calculated on-line using an aircraft response model or the like based on the selected escape manoeuvre direction is executed on the sixth step 666. If the escape manoeuvre is not activated, the process goes back to the first step 661 for calculation of a new escape manoeuvre.

In one example, wherein the present values related to navigational data of the own aerial vehicle lies somewhere between the values of the navigational data variable of two different table sheets 332a, 332b, 332c, 437a, 437b, 437c, 437d, 437e, 437f a set of possible, interpolated escape trajectories can be chosen in the third step 663. The set of interpolated escape trajectories is in one example determined based on the relation between the values of the navigational data variable of the two different table sheets and the present value(s) of the navigational data. For example, if the present value of the navigational data variable is the average between the values of the navigational data variable of the two different table sheets, then the interpolated escape trajectories can be computed as an average between the escape trajectories of the two different table sheets.

The invention claimed is:

1. A collision avoidance system, comprising:
   sensors configured during flight to receive navigational data regarding intruding aerial vehicle and an own aircraft;
   non-transitory storage configured to store a plurality of offline calculated predefined presimulated escape trajectories for the own aircraft,
   a processor configured during flight to presimulate the predefined presimulated escape trajectories, associate each predefined presimulated escape trajectory to a set of navigational data related to the own aircraft and to an escape manoeuvre direction, and compare at least a subset of the predefined presimulated escape trajectories with a presumed trajectory of the intruding aerial vehicle, and to select one of the predefined presimulated escape trajectories based on said comparison, such that the processor does not calculate the predefined presimulated escape trajectories, and
   an escape manoeuvre execution unit configured to permit the own aircraft to execute the selected one of the predefined presimulated escape trajectories.

2. The collision avoidance system according to claim 1, wherein the processor is arranged to choose at least a subset of those predefined escape trajectories for which the set of navigational data substantially coincides with navigational data related to the own aircraft for comparison with the presumed trajectory of the intruding aerial vehicle.

3. The collision avoidance system according to claim 1, wherein the set of navigational data comprises one or a plurality of the following quantities: velocity, altitude, attitude, angle of climb and roll angle.

4. The collision avoidance system according to claim 1, wherein the receiver is arranged to receive said set of navigational data.

5. The collision avoidance system according to claim 1, wherein the processor is arranged to calculate the presumed trajectory of the intruding aerial vehicle based on the received navigational data regarding the intruding aerial vehicle.

6. The collision avoidance system according to claim 1, further comprising:

an escape manoeuvre executer configured to execute an escape manoeuvre based on said selected pre-calculated escape trajectory.

7. The collision avoidance system according to claim 6, further comprising:
a second processor configured to calculate a refined escape trajectory based on the escape manoeuvre direction of the selected escape trajectory, wherein the escape manoeuvre executer is arranged to execute the escape manoeuvre based on the refined escape trajectory.

8. The collision avoidance system according to claim 6, further comprising:
an activator configured to activate said escape manoeuvre executer based on one or a plurality of preset criteria.

* * * * *